Oct. 30, 1956  A. C. SMIRALDO  2,768,682
ADJUSTABLE CAR SCREEN
Filed May 13, 1954
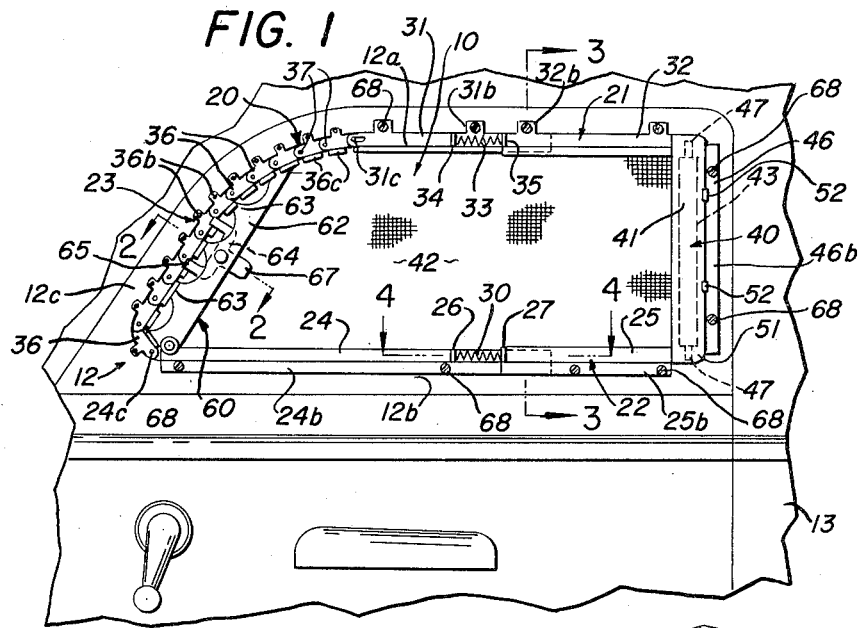
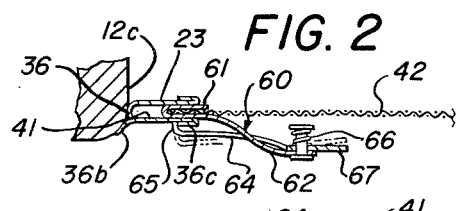
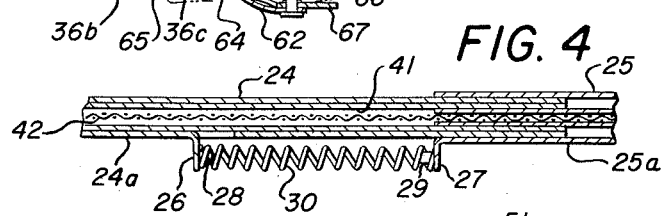
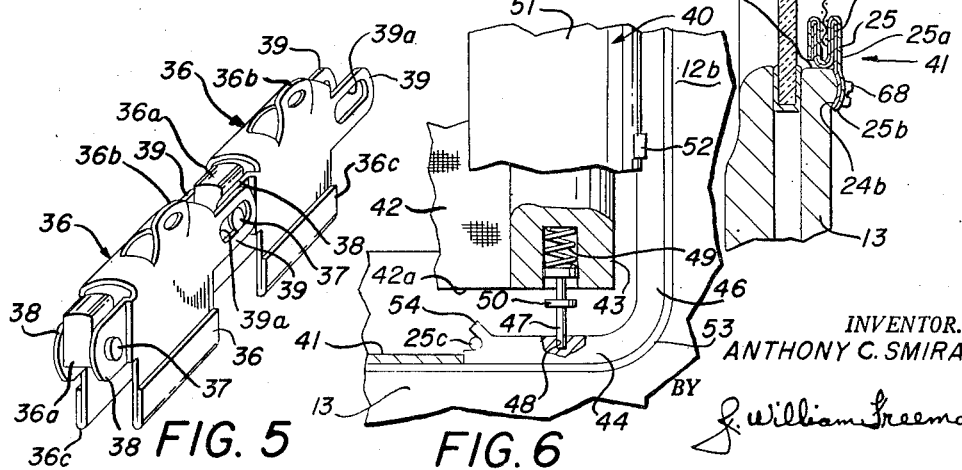
INVENTOR.
ANTHONY C. SMIRALDO
BY
J. William Freeman
ATTORNEY

United States Patent Office 2,768,682
Patented Oct. 30, 1956

2,768,682
ADJUSTABLE CAR SCREEN
Anthony C. Smiraldo, Cuyahoga Falls, Ohio
Application May 13, 1954, Serial No. 429,430
4 Claims. (Cl. 160—372)

This invention relates to screens, and in particular, relates to screens having particular utility in automobiles.

In the past, screens have been provided for automobiles but the same have been subject to several disadvantages. One particular disadvantage that has arisen is the inability to adapt conventional screens to use in automobiles due to the varying outline configurations of the window openings of various models of automobiles. It has also been cumbersome in the past to provide pre-built units in view of the fact that the same provided a storage problem when not in use because of their relative bulk.

It has also been attempted in the prior art to employ roll screens in automobiles. Such attempts have heretofore been unsuccessful because of the impossibility of fitting the roll screen member with respect to the outline of the car window opening.

Accordingly, it is one object of this invention to provide a window screen unit that will be adaptable to screen a car window regardless of the shape thereof.

It is a further object of this invention to provide a car screen that is simply and easily retracted with respect to the window opening.

It is a further object of this invention to provide a screen for car windows that is self-storing.

These and other objects of the invention will become more apparent upon a consideration of the following brief specification read in the light of the accompanying drawings.

Of the drawings:

Figure 1 is a side elevation, viewing the improved car screen from the inside of an automobile on which the same is mounted.

Figures 2, 3 and 4 are sectional views taken on the lines 2—2, 3—3 and 4—4 of Figure 1.

Figure 5 is a perspective view of successive links in the adjustable frame.

Figure 6 is an enlarged elevation showing the juncture between the adjustable frame member and the retractable screen member.

Referring now to the drawings and in particular to Figure 1 thereof, the car screen unit, generally designated as 10, is shown positioned interiorly of the conventional window glass 11, that is operable within the window opening 12, of an automobile 13.

As can best be seen from the drawings, the car screen unit 10, includes an adjustable frame member 20, having operably received therein a retractable screen member that is generally designated as 40.

As has been previously discussed, the frame member is of such construction to enable the same to be adapted to various shaped window openings that may be encountered for example, in various makes and models of automobiles. To this end, the frame member 20, is of substantially U-shaped construction, and includes top and bottom rails 21, 22, respectively, that are interconnected by a connecting rail 23, that is adjustable in a manner to be described, the arrangement being such that the rail members 21, 22, engage the top and bottom surfaces 12a, 12b, respectively, of the car window opening 12, while the connecting rail 23, is fitted to engage the front surface 12c, of said window 12. (See Figure 1.)

Although the top and bottom rails 21, 22, of the frame 20, are shown spaced in parallel relationship in Figure 1, it is manifest that the overall length of these respective rail members may vary from car to car, even though it is generally true that the bottom rail 22, is of somewhat greater length than the rail 21, because of the general streamlining effect normally present in today's automobiles. To compensate for the variations encountered, the rail members 21, 22, are shown as being of two-piece construction, wherein the overall length can be varied to fit any opening. For example, the rail 22, could be longer than, shorter than, or equal to the length of the rail 21, without change in principle.

Taking the rail 22, as being indicative of the construction employed, it will be seen from Figures 1, 4 and 6, that the same includes a pair of channel members 24, 25, of generally U-shaped cross-sectional configuration (see Figure 3), and being cooperatively engageable with each other to permit variation in the overall length thereof. For the purpose of maintaining the engaged channel members at a predetermined length during the usage thereof, the sidewalls 24a, 25a, are shown provided with struck tabs 26, 27, having lugs 28, 29, respectively, provided thereon for engagement with a compression spring 30, that is operable to urge the members 24, 25, apart and thus tensionally maintain the same in proper engagement with the window 12, during use of the car screen unit 10. By like token, the top rail 21, is defined by a pair of channel members 31, 32, that are tensionally urged apart by the spring 33, that is spaced between lugs 34, 35, respectively, in a similar manner. In both cases it is manifest that housings (not shown) may be incorporated around the spring members 30, 33, to hide the same from view.

As is best shown in Figure 1, the adjustable rail 23, is shown interconnected between the ends of the channel members 24 and 31, respectively, to permit cooperation thereof with the top and bottom rail members 21, 22, respectively. In essence, the adjustable rail 23, is made up of a plurality of link members 36, 36, which are shown successively connected together by appropriate pins 37, so as to present a bottom rail 23, that is capable of assuming a multiplicity of configurations. Each of the links 36, 36, is shown as being of generally U-shaped configuration that corresponds in size to the configuration of the channel members 24, 25, 31 and 32, the arrangement being such that the aforementioned members (24, 25, 31, 32 and 36, 36) cooperate to define a track generally designated as 41, within which the edges of a retractable screen 42, may be received in a manner to be described. With particular reference now to Figure 5 of the drawings, it will be seen that each link member 36 has the opposed end thereof provided with outwardly extending arcuate tabs 38, 38, and 39, 39, to facilitate pivoted juncture between successive links 36, 36. To this end, the tabs 38, 38, are shown offset by approximately the wall thickness thereof and are further illustrated as being provided with pins 37, 37, that are receivable within the slots 39a, 39a, of the tabs 39, 39. A block of resilient material 36a, is interposed between the tabs 39, 39, to continue the continuity between the window engaging surfaces 36c, 36c, of successive links 36, 36, while juncture of the overall rail 23, with the channel members 24 and 31, may be facilitated, for example, by providing these members 24, 31 with a pin 24c, and a slot 31c. (See Figure 1.)

Referring now to Figure 6, the retractable screen member 40, is shown as including flat screen member 42, that is wound about a roller 43, the opposed ends of which are supported between the side legs 44, 44, of a U-shaped bracket 46, that is engageable with the rear sidewall of a car window opening, 12. The roller 43, together with the screen 42, that is wound thereon, are shown as being removably positioned with respect to the bracket 46, through the medium of supporting pins 47, 47, that are receivable in appropriate apertures 48, 48, of the bracket 46. These pins 47, 47, are further shown as being axially shiftable with respect to the roller 43, and are normally urged outwardly therefrom by springs 49, 49, although retraction from within the apertures 48, 48, may be effectuated by the movement of the shoulders 50, 50, provided on the pins 47, 47. Accessibility to the roller 43, is provided for by the cover 51, that is hinged, as at 52, to the bracket 46. A resilient covering 53, is provided on the bracket to prevent marring of the car window opening 12, when the retractable screen unit 40, is positioned thereagainst.

To the end of positioning the screen unit 40, in the car window opening 12, in cooperative association with the adjustable frame member 20, the bracket 46 has the side leg 44 thereof provided with a forked end portion 54, that is engageable with pin 25c, that extends between the sidewalls of the channel member 25 (see Figure 6), it being understood that a similar arrangement is utilized at the opposite end of the unit 40 to retain the same with respect to the channel 32. With the screen unit 40, positioned as just described with respect to the adjustable frame 20, the screen 42, upon unwinding from about the roller 43, will have its edge portions 42a thereof receivable within the track 41, as the same is defined by channel members 24, 25, 31 and 32. (See Figure 3.)

Because the roller 43, may be spring-loaded to exert retracting force on the extended screen 42, the leading edge of the screen 42, is provided with a clamping mechanism 60, for securing the edge of screen 42, with respect to the adjustable bottom rail 23. In view of the salient fact the car screen unit 40, is custom-built to fit the model car the same will be used on, it is manifest that the configuration of the clamping mechanism 60, will vary accordingly, in order to conform to the shape of car window opening 12, with which it is being used. It will, in every case, cooperate with the rail 23, which is adjustable from car to car, in a manner described. Accordingly, the clamping member 60, includes a stiffener 61, of appropriate contour, that is secured around the leading edge of the screen 42, so as to be received within the track 41, that is defined by the successive links 36, 36. A frame member 62, is connected with the stiffener through the medium of arms 63, 63, and serves as support for a hook member 64, that is pivoted thereto and has the hook end 65, thereof, engageable with a projecting surface 36c, of the link 36. This hook member 64, is normally held in engagement with the surface 36c, by a tension spring 66, although it is manifest that inward movement of a tab extension 67, to the position indicated by the chain-dotted lines of Figure 2 will operate to release the hook end 65, from engagement with the surface 36c.

Although the assembled car screen unit 10, may be positioned within the window opening 12, and retained therein by virtue of the tensional force exerted by the springs 30 and 33, it is preferred to permanently fix at least part of the same to the frame. To this end, the channel members 24, 25, 31 and 32, the links 36, 36, and the bracket 46, may be provided with flange extensions 24b, 25b, 31b, 32b, 36b and 46b, respectively, that are capable of receiving screws 68, for screwing the same to the frame of the car window opening 12. It is manifest that these flanges may be secured in other known ways to the frame of the opening 12, or may be omitted entirely or not used at all, dependent upon existent conditions. In any case, the same will operate to position the screen unit 10, free and clear of the window glass 11, so that the same may be raised or lowered without interference from the installed car screen unit 10.

In use or operation of the improved car screen 10, the adjustable frame portion 20, thereof, is first positioned within the car window opening 12, with the spring members 30 and 33, tensionally urging the top and bottom rail members 21 and 22, respectively, into contact with the frame of the window opening 12, and thus urging the adjustable rail 23, into conforming configuration with the structural outline of the front portion of the car window 12. In this position the retractable screen unit 40, may be positioned with respect to the channel members 25 and 32, respectively, by engagement of the forked end 54, of the bracket 46, engaging upon the pins 25c, 32c, of the channel members 25 and 32, respectively. With the retractable screen unit 40 thus assembled with respect to the adjustable frame 20, that has been previously positioned as described, the flanges of the component parts may be secured and the screen member 42, may be unwound from around the roller 43, with the edge portions 42, thereof being received in the track 41, of the respective channel members (see Figure 3). Upon movement to the extreme left of Figure 1, the hook end 65, of the clamping mechanism 60, will be urged into position of the chain-dotted lines of Figure 2 upon contact with the link member 36. As further movement to the left is continued against the force of the spring 66, the hook end 65 will move into the position of the full lines of Figure 2 and the car screen will then be in operating use and be securely positioned so as to prevent the entrance of insects and other matter therethrough. If it is desired to open the car screen for any reason whatsoever, the tab 67, of the clamping mechanism 60, will be moved against the force of the spring 66, and the screen moved to the right (Figure 1) for rewinding about the roll 43. If it is desired, the roll 43, may be spring-loaded for increasing the effectiveness of this operation. If is desired to remove the screen roller unit for any reason whatsoever, it is merely necessary to open the hinged cover 51, and remove the same by axially depressing the shoulder 50, provided on the pin 47. Complete removal of the entire screen unit may be effectuated by first removing the screws 68, 68, and then moving, for example, the channel members 32 and 25, against the force of the springs 33 and 30, respectively, to disengage the pin 25c from the forked end 54, at which time the adjustable frame unit 20, may easily be removed from the window frame opening 12.

It will be seen from the foregoing that there has been provided a new and novel car screen unit wherein a single frame is readily adapted to fit a plurality of differently shaped retractable screen members. It has been shown how the adjustable frame member can be used in several different cars in conjunction with entirely different types of retractable screen members. It has been further shown how the device is of simple construction and is capable of utilization without interfering with the raising and lowering of the conventional window glass of an automobile. The use of the operation and the self-storing features of the retractable screen have also been explained in connection with the invention. It is apparent that the feature of providing a track member within which a pre-shaped screen member can be received operates to provide an efficient screen unit. The provision of providing an adjustable frame member that includes this track and can further be adapted to use on various configurations increases this efficiency.

It will be apparent from the foregoing that several modifications of the device could be resorted to without the exercise of invention. Such modifications could reasonably include alteration of the configuration of the component frame members that comprise the adjustable frame, as well as simplification of the clamping mechanism. It is also within the contemplated scope of this invention to provide a pre-formed frame member having a track member that would be cooperatively associated with the retractable screen member, thus eliminating the adjustment features that have been described above.

Other modifications of similar scope and equivalence may be resorted to without departing from the spirit thereof or the scope of the appended claims.

What is claimed is:

1. A screen unit for automobile window openings, comprising: a U-shaped frame including non-flexible side members interconnected by a flexible base member; a channel, defined by said side and bottom members of said frame; a second frame, having the free ends thereof engageable with the free ends of said side members to define therewith a closed frame member receivable in said window opening; a roller having the opposite ends thereof supported by said second-mentioned frame; a screen having one end thereof secured to said roller and being capable of being wound and unwound with respect to said roller; the extended edge portions of said screen being receivable in said channel upon extension and retraction thereof and means for normally urging said base of said U-shaped frame member away from said second-named frame member.

2. A screen unit for automobile window openings, comprising: a U-shaped frame including non-flexible side members interconnected by a flexible base member; a channel, defined by said side and bottom members of said frame; a second frame, having the free ends thereof engageable with the free ends of said side members to define therewith a closed frame member receivable in said window opening; a roller having the opposite ends thereof supported by said second-mentioned frame; a screen having one end thereof secured to said roller and being capable of being wound and unwound with respect to said roller; the extended edge portions of said screen being receivable in said channel upon extension and retraction thereof; said flexible base member including a plurality of pivoted link members.

3. A screen unit for automobile window openings, comprising: a U-shaped frame including non-flexible side members interconnected by a flexible base member; a channel, defined by said side and bottom members of said frame; a second frame, having the free ends thereof engageable with the free ends of said side members to define therewith a closed frame member receivable in said window opening; a roller having the opposite ends thereof supported by said second-mentioned frame; a screen having one end thereof secured to said roller and being capable of being wound and unwound with respect to said roller; the extended edge portions of said screen being receivable in said channel upon extension and retraction thereof; at least one of said non-flexible side members including a pair of cooperatively engageable elements that are tensionally urged apart.

4. A screen unit for automobile window openings, comprising: a U-shaped frame including non-flexible side members interconnected by a flexible base member; a channel, defined by said side and bottom members of said frame; a second frame, having the free ends thereof engageable with the free ends of said side members to define therewith a closed frame member receivable in said window opening; a roller having the opposite ends thereof supported by said second-mentioned frame; a screen having one end thereof secured to said roller and being capable of being wound and unwound with respect to said roller; the extended edge portions of said screen being receivable in said channel upon extension and retraction thereof; said flexible base member including a plurality of pivoted link members; at least one of said non-flexible side members including a pair of cooperatively engageable elements that are tensionally urged apart.

References Cited in the file of this patent

UNITED STATES PATENTS

| | | |
|---|---|---|
| 181,318 | Davis | Aug. 22, 1876 |
| 232,725 | Joseph | Sept. 28, 1880 |
| 1,210,012 | Snell | Dec. 26, 1916 |
| 2,223,477 | Bernier | Dec. 3, 1940 |
| 2,665,754 | Claussen et al. | Jan. 12, 1954 |